US011554966B2

(12) United States Patent
Jin et al.

(10) Patent No.: US 11,554,966 B2
(45) Date of Patent: Jan. 17, 2023

(54) NANOSTRUCTURED TITANIC ACID SALTS AND PREPARATION PROCESS AND USE THEREOF

(71) Applicant: PetroChina Company Limited, Beijing (CN)

(72) Inventors: Xu Jin, Beijing (CN); Jianming Li, Beijing (CN); Xiaoqi Wang, Beijing (CN); Hang Jiao, Beijing (CN); Liang Sun, Beijing (CN); Xiaodan Liu, Beijing (CN)

(73) Assignee: PetroChina Company Limited, Beijing (CN)

( * ) Notice: Subject to any disclaimer, the term of this patent is extended or adjusted under 35 U.S.C. 154(b) by 574 days.

(21) Appl. No.: 16/554,862

(22) Filed: Aug. 29, 2019

(65) Prior Publication Data
US 2020/0071183 A1 Mar. 5, 2020

(30) Foreign Application Priority Data

Aug. 30, 2018 (CN) .......................... 201811001861.6

(51) Int. Cl.
*C01G 23/00* (2006.01)
*C01G 23/08* (2006.01)
*C09C 3/06* (2006.01)
*C09C 3/10* (2006.01)
*H01M 4/485* (2010.01)
*B82Y 40/00* (2011.01)

(52) U.S. Cl.
CPC ......... *C01G 23/001* (2013.01); *C01G 23/005* (2013.01); *C01G 23/006* (2013.01);
(Continued)

(58) Field of Classification Search
CPC .. C01G 23/001; C01G 23/005; C01G 23/006; C01G 23/08; C09C 3/063; C09C 3/10;
(Continued)

(56) References Cited

U.S. PATENT DOCUMENTS

| 4,606,906 A * | 8/1986 | Ritter .................. C01G 23/006 501/12 |
| 2013/0102458 A1 | 4/2013 | Wong et al. |
| 2014/0072804 A1 | 3/2014 | Hobbs et al. |

FOREIGN PATENT DOCUMENTS

| CN | 1202462 A | 12/1998 |
| CN | 101723441 A | 6/2010 |

(Continued)

OTHER PUBLICATIONS

Kim, D.H., et al., "Polyol-mediated synthesis of Li4Ti5O12 nanoparticle and its electrochemical properties", Electrochemistry Communications 7 (2005) 1340-1344.
(Continued)

Primary Examiner — Anthony J Zimmer
(74) Attorney, Agent, or Firm — Hamilton, Brook, Smith & Reynolds, P.C.

(57) ABSTRACT

The present invention provides a nanostructured titanic acid salt and a preparation process and use thereof. The process comprises preparing a dispersion containing titanium peroxy complex; slowly adding a metal compound to the dispersion containing the titanium peroxy complex to form a solution; adding an alcohol to the solution under normal temperature and normal pressure to produce the nanostructured titanic acid salt precursor precipitate in the solution, and separating the precipitate to obtain the titanic acid salt precursor; drying the precursor, and then heat treating it to obtain the nanostructured titanic acid salt product. The present invention provides a process for preparing a titanic acid salt with simple preparation process, easy control for process parameters and easy large-scale industrial production.

17 Claims, 5 Drawing Sheets

(52) U.S. Cl.
CPC .............. *C01G 23/08* (2013.01); *C09C 3/063* (2013.01); *C09C 3/10* (2013.01); *H01M 4/485* (2013.01); *B82Y 40/00* (2013.01); *C01P 2004/64* (2013.01)

(58) Field of Classification Search
CPC ........ H01M 4/485; H01M 4/366; H01M 4/62; H01M 10/0525; H01M 10/054; B82Y 40/00; B82Y 30/00; C01P 2004/64; C01P 2004/03; C01P 2004/16; C01P 2006/40; Y02E 60/10
See application file for complete search history.

(56) References Cited

FOREIGN PATENT DOCUMENTS

| | | | |
|---|---|---|---|
| CN | 102153137 | A | 8/2011 |
| CN | 103979605 | A | 8/2014 |
| CN | 104064735 | A | 9/2014 |
| CN | 104201364 | A | 12/2014 |
| CN | 108275718 | A | 7/2018 |
| CN | 109326790 | A * | 2/2019 ............ B82Y 30/00 |
| CN | 109326790 | A | 2/2019 |
| CN | 109809468 | A * | 5/2019 |
| JP | H0558633 | A | 3/1993 |
| JP | 2010228980 | | 10/2010 |
| RO | 115046 | B1 | 10/1999 |
| WO | 2017155070 | A1 | 9/2017 |

OTHER PUBLICATIONS

Mao, Y., et al., "Synthesis and Growth Mechanism of Titanate and Titania One-Dimensional Nanostructures Self-Assembled into Hollow Micrometer-Scale Spherical Aggregates", J. Phys. Chem B 2006, 110, 702-710.

Extended Search Report for EP Application No. 19194480.0 "Nanostructured titanic acid salts and preparation process and use thereof", dated Nov. 19, 2019.

* cited by examiner

NANOSTRUCTURED TITANIC ACID SALTS AND PREPARATION PROCESS AND USE THEREOF

RELATED APPLICATION

This application claims priority under 35 U.S.C. § 119 or 365 to China Application No. 201811001861.6, filed Aug. 30, 2018. The entire teachings of the above application is incorporated herein by reference.

TECHNICAL FIELD

The present invention relates to, in particular, a nanostructured titanic acid salt and a preparation process and use thereof, which pertains to a technical field of materials.

BACKGROUND

As a hotspot for research in the field of materials, titanic acid salts have been widely used in the fields of battery electrodes, piezoelectrics and the like. The application properties of titanic acid salt materials are closely related to their particle size. For example, a nanostructure can reduce the particle size of the material. When it is applied to the battery electrode, the distance and path for intercalating and deintercalating ions can be reduced, and the rapid charge and discharge performance of the battery can be improved. The nanostructure can also increase the specific surface area of the material, which can adsorb more conductive agent and increase the contact area with the electrolyte solution, thus reduce the current density, and further improve the rapid charge and discharge performance of the material. Therefore, the preparation and synthesis of titanic acid salt particles with nanometer scale will greatly improve the application effect of the titanic acid salt material.

Existing processes for producing titanic acid salts mainly include solid state synthesis and hydrothermal reaction preparation. Among them, the solid state synthesis process is generally carried out by ball-milling titanium oxide and carbonate or hydroxide, and annealing at a high temperature of more than 800 degrees Celsius. The titanic acid salt prepared by the process is generally on the micrometer scale, with a poor morphology and uniformity and a low purity, so that the optimal application effect of the titanic acid salt material cannot be obtained.

The hydrothermal preparation of the nanostructured titanic acid salt is generally carried out by producing sodium titanate via a hydrothermal process from commercial titanium oxide and sodium hydroxide as a starting material, immersing sodium titanate in an acid solution to obtain titanic acid through an ion exchange process; then mixing titanic acid with a metal salt solution to obtain the titanic acid salt precursor, and subsequently annealing the product at different temperatures to give the titanic acid salt product. The hydrothermal process of the preparation involves high temperature and high pressure and is dangerous. Meanwhile, the reaction system has 10 mol/L of sodium hydroxide, which is very corrosive under a high hydrothermal temperature of more than 180° C. and a high hydrothermal pressure of more than 10 atmospheric pressure. The reaction system is very demanding on hydrothermal reaction apparatus, which causes difficulty to find a suitable reaction apparatus, and thus the synthesis cost is expensive. In addition, the preparation process uses a corrosive alkali at a high concentration, which makes the subsequent sodium titanate product difficult to separate and purify, and also brings serious pollution to the environment. Thus, the hydrothermal preparation of nanostructured titanic acid salt still has difficulties in either the synthesis apparatus or the synthesis process and subsequent treatment, and cannot realize large-scale production.

Therefore, the development of a process for preparing nanostructured titanic acid salts with a simple process and easy large-scale production without high-temperature or high-pressure synthesis conditions, still has significant challenges.

SUMMARY OF THE PRESENT INVENTION

An object of the present invention is to provide a process for preparing a titanic acid salt.

Another object of the present invention is to provide a titanic acid salt.

A further object of the present invention is to provide use of the titanic acid salt.

In order to achieve the above object, in one aspect, the present invention provides a process for preparing a nanostructured titanic acid salt, comprising:

Step S1, preparing a dispersion containing titanium peroxo-complex;

Step S2, slowly adding a metal compound to the dispersion containing titanium peroxo-complex to form a solution;

Step S3, adding an alcohol to the solution under normal temperature and normal pressure to produce the nanostructured titanic acid salt precursor precipitate in the solution, and separating the precipitate to obtain the titanic acid salt precursor; and Step S4, drying the precursor and then heat treating it to obtain a product of the nanostructured titanic acid salt.

According to some particular embodiments of the present invention, the titanic acid salt is one or more selected from the group consisting of lithium titanate, sodium titanate, potassium titanate, calcium titanate, barium titanate, strontium titanate and copper calcium titanate.

According to some particular embodiments of the present invention, in the step S1, the dispersion containing titanium peroxo-complex contains the titanium peroxo-complex at a concentration of 0.01 mol/L to 1 mol/L.

According to some particular embodiments of the present invention, in the step S1, the dispersion containing titanium peroxo-complex contains the titanium peroxo-complex at a concentration 0.05 mol/L to 0.5 mol/L.

According to some particular embodiments of the present invention, in the step S1, the process for preparing the dispersion containing titanium peroxo-complex includes dispersing a titanium source in an aqueous peroxide solution to form a dispersion; the titanium source is one or more selected from the group consisting of titanic acid, titanium metal, titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride, ammonium fluorotitanate, titanium nitride, and titanium oxide; the peroxide is one or more selected from the group consisting of hydrogen peroxide, urea peroxide and peracetic acid.

According to some particular embodiments of the present invention, the titanium source is one selected from hydrated titanic acid, metatitanic acid, and orthotitanic acid.

According to some particular embodiments of the present invention, the hydrated titanic acid is obtained from a titanium-containing compound via a hydrolysis reaction.

According to some particular embodiments of the present invention, the titanium-containing compound is one or more selected from the group consisting of titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride, and ammonium fluorotitanate.

According to some particular embodiments of the present invention, the hydrolysis reaction is to disperse the titanium-containing compound in pure water for direct hydrolysis to form the hydrated titanic acid; or the hydrolysis reaction is to disperse the titanium-containing compound in an aqueous solution containing an alkaline substance for hydrolysis to form the hydrated titanic acid.

According to some particular embodiments of the present invention, the hydrolysis reaction is carried out at a normal temperature.

According to some particular embodiments of the present invention, the alkaline substance is one or more selected from the group consisting of aqueous ammonia, lithium hydroxide, sodium hydroxide, potassium hydroxide, tetramethylammonium hydroxide, tetraethylammonium hydroxide, tetrapropylammonium hydroxide, tetrabutylammonium hydroxide, ethylenediamine, diethylamine, triethylamine, ethylamine, ethanolamine, and diethanolamine.

According to some particular embodiments of the present invention, the concentration of the alkaline substance in the aqueous solution containing the alkaline substance is 0.001 to 1 M.

According to some particular embodiments of the present invention, the hydrated titanic acid is obtained from the titanium-containing compound by a hydrolysis reaction and a purification treatment; and the purification treatment comprises purifying a product obtained by subjecting the titanium-containing compound to a hydrolysis reaction, to obtain the hydrated titanic acid having a purity greater than or equal to 97%.

According to some particular embodiments of the present invention, the purification treatment is one or more selected from water washing—separation by centrifugation, water washing—membrane separation, water washing—filtration and dialysis.

According to some particular embodiments of the present invention, the dispersion containing titanium peroxo-complex may be in the state of a solution, a suspension, or an emulsion.

According to some particular embodiments of the present invention, the molar ratio of the titanium source to the peroxide in the aqueous peroxide solution is 1:3 to 1:6.

According to some particular embodiments of the present invention, in the step S1, a polymer is added to the dispersion while preparing the dispersion containing titanium peroxo-complex; the polymer is one or more selected from the group consisting of chitosan, guar gum, methyl cellulose, ethyl cellulose, hydroxyethyl cellulose, hydroxypropyl cellulose, hydroxypropyl methyl cellulose, polyvinyl alcohol, polyacrylamide, polyethylene oxide, and polyvinyl pyrrolidone; the content of the polymer added in the solution is 0.01% to 10%.

According to some particular embodiments of the present invention, in the step S1, the content of the polymer added in the solution is 0.1% to 1%.

According to some particular embodiments of the present invention, the added polymer is in a form selected from a polymer solid and an aqueous polymer solution.

According to some particular embodiments of the present invention, in the step S2, the metal compound is a water-soluble metal compound.

According to some particular embodiments of the present invention, the metal compound is selected from a first metal compound, or a composition of a first metal compound and a second metal compound.

According to some particular embodiments of the present invention, the first metal compound is one or more selected from the group consisting of a metal hydroxide, a metal oxide, a metal peroxide, and a metal superoxide.

According to some particular embodiments of the present invention, the second metal compound is one or more selected from the group consisting of a metal chloride, a metal fluoride, a metal bromide, a metal nitrate, a metal sulfate, a metal phosphate, and a metal acetate.

It can be understood that the metal in the metal compound of the present invention is the metal moiety forming the titanic acid salt.

According to some particular embodiments of the present invention, in the step S2, the concentration of the metal ion in the solution formed by adding the metal compound is 0.5 mol/L to 4.0 mol/L.

According to some particular embodiments of the present invention, wherein the added metal compound is in a form selected from the group consisting of a metal compound solid and an aqueous metal compound solution.

According to some particular embodiments of the present invention, the normal temperature is 15 degrees Celsius to 35 degrees Celsius; and the normal pressure is a standard atmospheric pressure at room temperature.

According to some particular embodiments of the present invention, in the step S3, the alcohol is one or more selected from the group consisting of methanol, ethanol, propanol, butanol, pentanol, ethylene glycol, propylene glycol, glycerol, and polyethylene glycol.

According to some particular embodiments of the present invention, in the step S3, the alcohol is added in a volume ratio of 5% to 50% of the solution.

According to some particular embodiments of the present invention, in the step S3, the precipitant is added in a volume ratio of 15% to 40% of the solution.

According to some particular embodiments of the present invention, in the step S3, the separation is carried out by means of solid-liquid separation.

According to some particular embodiments of the present invention, in the step S3, the separation is carried out by one of centrifugation, filtration, suction filtration, and membrane separation.

According to some particular embodiments of the present invention, in the step S3, the precipitant is added in a volume ratio of 10% to 25% of the solution.

According to some particular embodiments of the present invention, in the step S4, the heat treatment is carried out at a temperature of 150° C. to 1000° C. for 1 hour to 24 hours.

According to some particular embodiments of the present invention, in the step S4, the heat treatment is carried out at a temperature of 300° C. to 700° C.

According to some particular embodiments of the present invention, in the step S4, the heat treatment is carried out at a temperature of 350° C. to 750° C.

According to some particular embodiments of the present invention, in the step S4, the heat treatment is carried out for 3 hours to 8 hours.

According to some particular embodiments of the present invention, the process further comprises the step of surface modifying the titanic acid salt product produced in the step S4; the surface modification comprises supporting one or more materials selected from the group consisting of carbon, carbon nanotubes, graphene, black phosphorus, and metals.

In another aspect, the present invention also provides a titanic acid salt prepared by the preparation process.

In still another aspect, the present invention also provides use of the titanic acid salt in the production of a piezoelectric material and the production of an ion battery electrode material.

According to some particular embodiments of the present invention, the ion battery is selected from a lithium ion battery, a sodium ion battery, a potassium ion battery, or a magnesium ion battery.

In summary, the present invention provides a titanic acid salt and a preparation process and use thereof. The process according to the present invention has the following advantages:

(1) the present invention provides a process for preparing a titanic acid salt with simple preparation process, easy control for process parameters and easy large-scale industrial production; and (2) the raw materials are easily available and the production cost is low.

DETAILED DESCRIPTION OF EMBODIMENTS

The implementation of the present invention and the beneficial effects thereof are described in detail below by way of specific examples, which are intended to help the readers better understand the spirit and characteristics of the present invention, but do not limit the implementable scope of the present invention.

EXAMPLE 1

Figure 1:
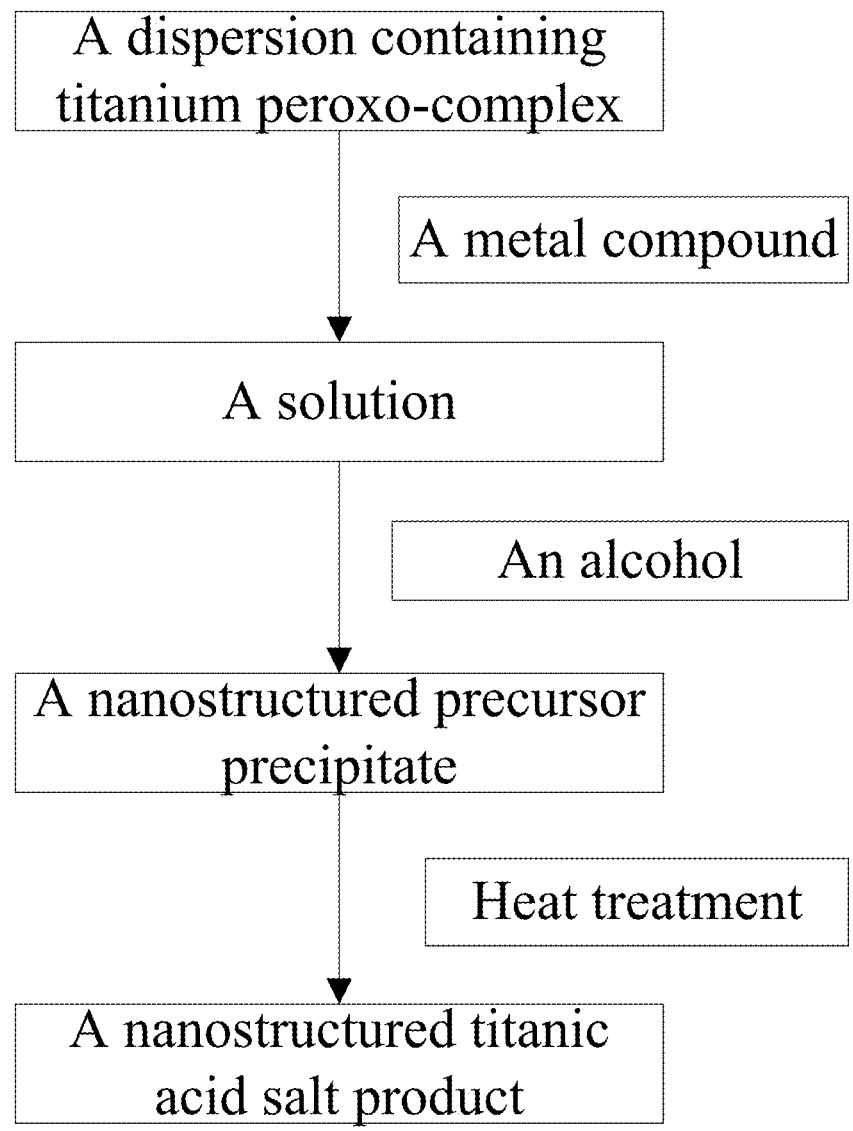
FIG. 1 is a flowchart of the preparation process according to the present invention.
Figure 2:
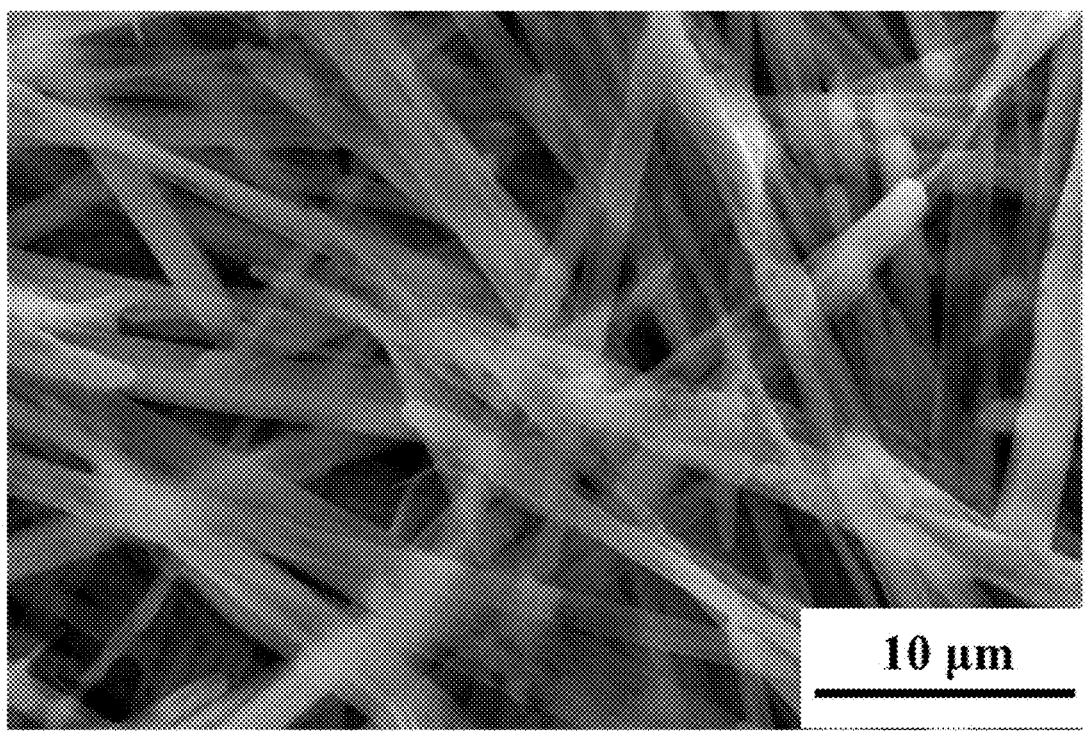
FIG. 2 is a SEM image of nanowire sodium titanate precursor precipitate product of Example 1.
Figure 3:
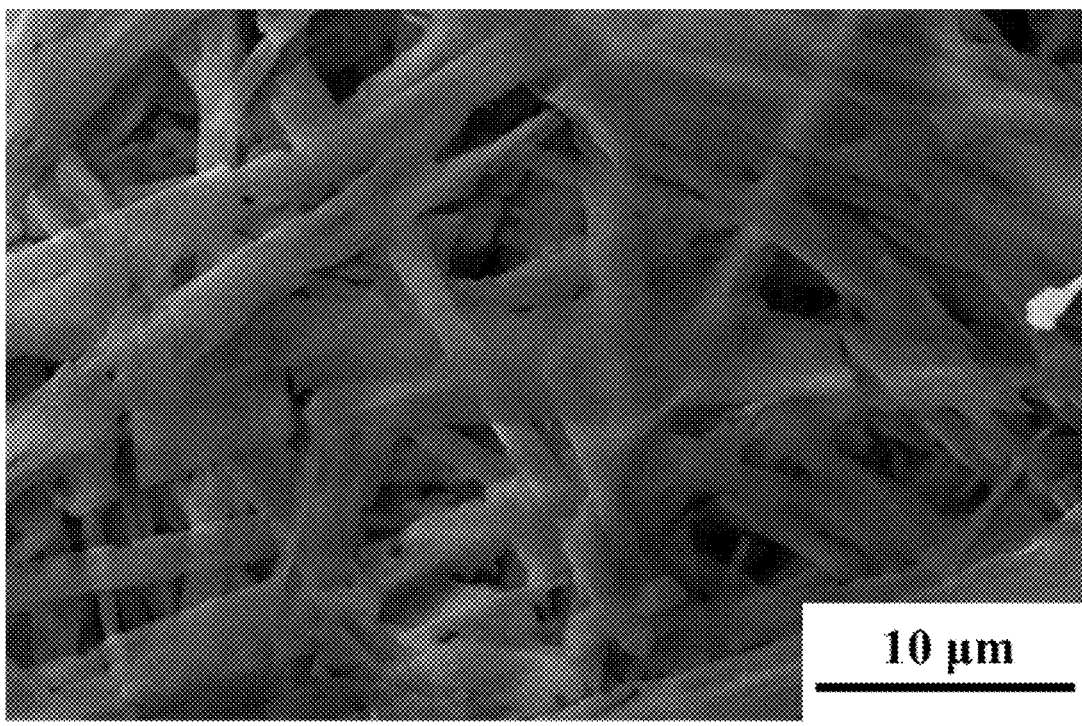
FIG. 3 is a SEM image of nanowire sodium titanate product of Example 1.

According to the process shown in FIG. 1, under stirring, 4 g of titanium isopropoxide was dispersed in 100 ml of water, and then 8 ml of 30% hydrogen peroxide was added thereto under stirring to form a suspension containing titanium peroxo-complex. Next, 10 g of sodium hydroxide was added to the above suspension of peroxo-complex under stirring to form a pale yellow transparent solution. Next, 30 ml of ethanol was slowly added to the transparent solution under stirring at room temperature to obtain a one-dimensional nanowire precursor precipitate, which was separated by filtration to obtain sodium titanate precursor precipitate. The SEM image thereof is shown in FIG. 2. Subsequently, the precursor precipitate was dried, and then heated at 300 degrees Celsius for 24 hours to obtain a one-dimensional nanowire sodium titanate product. The SEM image thereof is shown in FIG. 3.

Figure 4:
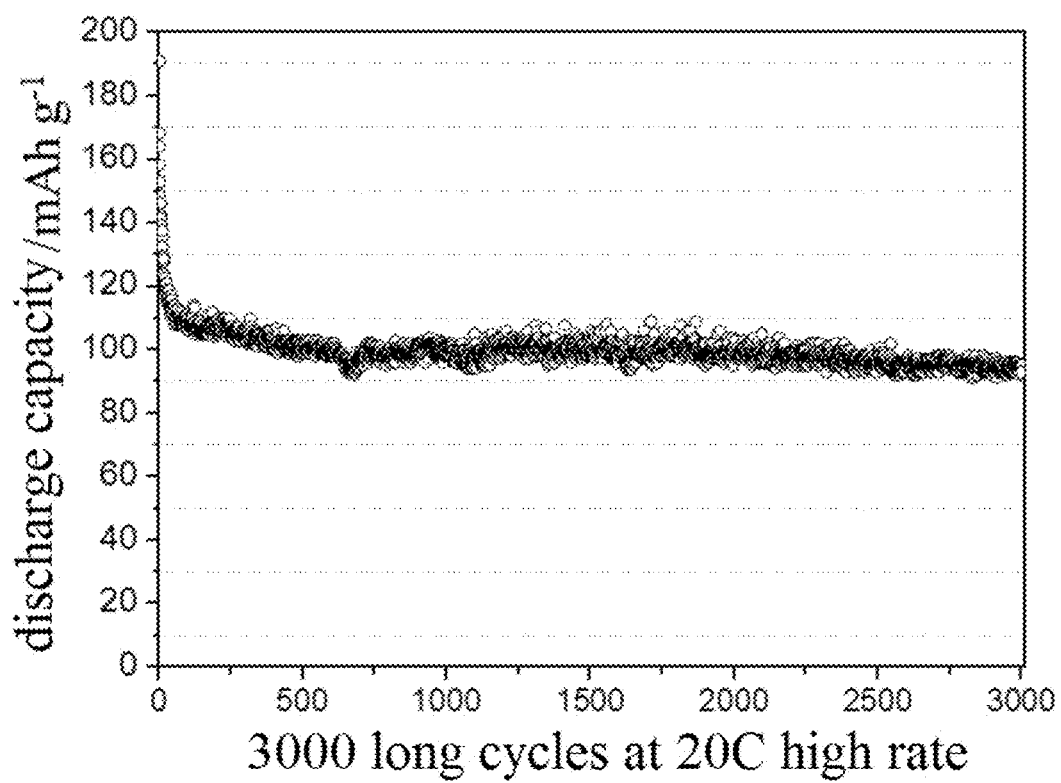
FIG. 4 is a curve showing the results of the cycle performance test of the sodium ion battery using the nanowire sodium titanate obtained in Example 1 as the electrode material.

FIG. 4 is a curve showing the results of the cycle performance test of the sodium ion battery using the nanowire sodium titanate obtained in this Example as the electrode material. The sodium ion battery electrode was prepared using knife coating process. Firstly, a slurry was prepared by mixing the raw materials in a mass ratio of sodium titanate (hierarchical microspheres): Super P:polyvinylidene fluoride (PVDF)=7:2:1 with N-methylpyrrolidone (NMP) as a solvent. Subsequently the slurry was uniformly coated on a copper foil using a knife coater, and then a model CR2032 button cell was assembled in a glove box with metallic lithium as a counter electrode, 1 mol/L $NaClO_4$ dissolved in EC/DMC (in volume ratio of 1:1) with a volume fraction of 2% of FEC additive as the electrolytic solution, and Glass Fiber as a separator, which was electrochemically tested. As can be seen from FIG. 4, due to small particle size and one-dimensional linear structure of the material, the performance test result of the sodium ion battery using the material is excellent, and it still has a discharge capacity of 90 $mAhg^{-1}$ after 3000 cycles at 20 C high-rate charge and discharge rate, showing extremely high performance of sodium ion battery and excellent long-term cycle stability.

EXAMPLE 2

According to the process shown in FIG. 1, under stirring, 3 g of titanium isopropoxide was dispersed in 100 ml of water, and then 6 g of urea peroxide was added thereto under stirring to form a suspension containing titanium peroxo-complex. Next, 8 g of sodium oxide was added to the above suspension of peroxo-complex under stirring to form a pale yellow transparent solution. Next, 10 ml of isopropanol was slowly added to the transparent solution under stirring at room temperature to obtain a precursor precipitate, which was separated by suction filtration to obtain sodium titanate precursor precipitate. The SEM image thereof is substantially the same as FIG. 2. Subsequently, the precursor precipitate was dried, and then heated at 450 degrees Celsius for 4 hours to obtain a sodium titanate product. The SEM image thereof is substantially the same as FIG. 3.

EXAMPLE 3

According to the process shown in FIG. 1, under stirring, 1 g of tetrabutyl titanate was dispersed in 100 ml of water, and then 2 ml of 30% hydrogen peroxide was added thereto under stirring to form a suspension containing titanium peroxo-complex. Next, 2 g of sodium peroxide and 3 g of sodium chloride were added to the above suspension of peroxo-complex under stirring to form a pale yellow transparent solution. Next, 30 ml of methanol was slowly added to the transparent solution under stirring at room temperature to obtain a precursor precipitate, which was separated by centrifugation to obtain sodium titanate precursor precipitate. The SEM image thereof is substantially the same as FIG. 2. Subsequently, the precursor precipitate was dried, and then heated at 900 degrees Celsius for 1 hour to obtain a sodium titanate product. The SEM image thereof is substantially the same as FIG. 3.

EXAMPLE 4

According to the process shown in FIG. 1, under stirring, 2 g of titanium sulfate was dispersed in 100 ml of water, and then 10 ml of 30% peracetic acid was added thereto under stirring to form a suspension containing titanium peroxo-complex. Next, 3 g of sodium superoxide and 5 g of sodium acetate were added to the above suspension of peroxo-complex under stirring to form a pale yellow transparent solution. Next, 30 ml of propanol was slowly added to the transparent solution under stirring at room temperature to obtain a precursor precipitate, which was separated by membrane to obtain sodium titanate precursor precipitate. The SEM image thereof is substantially the same as FIG. 2. Subsequently, the precursor was separated and dried, and then heated at 800 degrees Celsius for 2 hours to obtain a sodium titanate product. The SEM image thereof is substantially the same as FIG. 3.

EXAMPLE 5

According to the process shown in FIG. 1, under stirring, 2 g of titanium ethoxide was ultrasonically dispersed in 100 ml of water, and then 4 ml of 30% hydrogen peroxide was added thereto under stirring to form a suspension containing titanium peroxo-complex. Next, 8 g of sodium superoxide was added to the above suspension of peroxo-complex under stirring to form a pale yellow transparent solution. Next, 5 ml of butanol was slowly added to the transparent solution under stirring at room temperature to obtain a precursor precipitate, which was separated by filtration to obtain sodium titanate precursor precipitate. The SEM image thereof is substantially the same as FIG. 2. Subsequently, the precursor precipitate was dried, and then heated at 650 degrees Celsius for 3 hours to obtain a sodium titanate product. The SEM image thereof is substantially the same as FIG. 3.

EXAMPLE 6

According to the process shown in FIG. 1, under stirring, 4 g of titanium tetrafluoride was ultrasonically dispersed in 100 ml of water, and then 10 ml of 30% hydrogen peroxide with 0.1% hydroxypropyl methyl cellulose was added thereto under stirring to form a suspension containing titanium peroxo-complex. Next, 10 g of sodium hydroxide was added to the above suspension of peroxo-complex under stirring to form a pale yellow transparent solution. Next, 20 ml of propylene glycol was slowly added to the transparent solution under stirring at room temperature to obtain a precursor precipitate, which was separated by filtration to obtain sodium titanate precursor precipitate. The SEM image thereof is substantially the same as FIG. 2. Subsequently, the precursor precipitate was dried, and then heated at 500 degrees Celsius for 4 hours to obtain a sodium titanate product. The SEM image thereof is substantially the same as FIG. 3.

EXAMPLE 7

Figure 5:
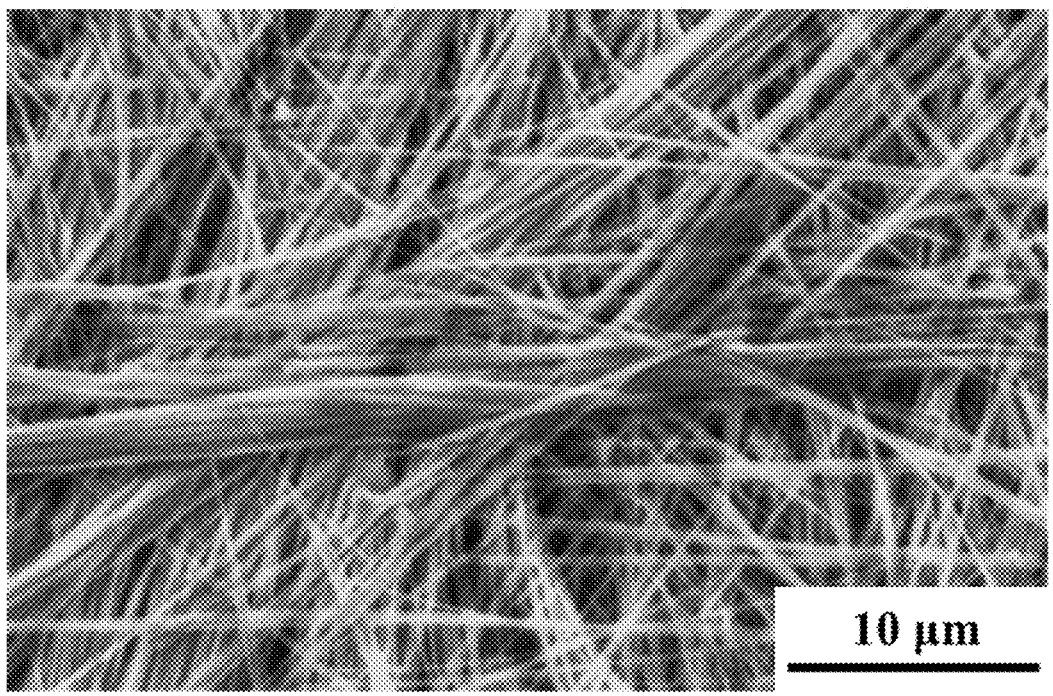
FIG. 5 is a SEM image of lithium titanate precursor precipitate product of Example 7.
Figure 6:
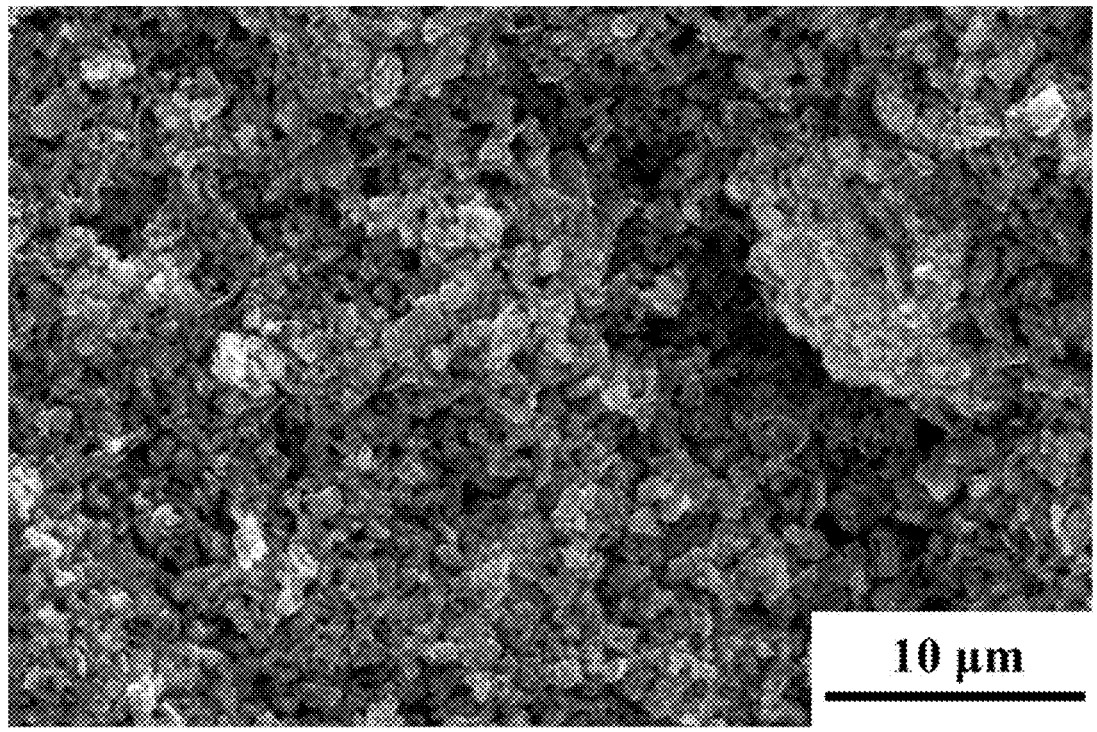
FIG. 6 is a SEM image of lithium titanate nanoparticle product of Example 7.

According to the process shown in FIG. 1, under stirring, 3 g of titanium tetrachloride was dispersed in 100 ml of water to form a solution, and then lithium hydroxide at a concentration of 0.1 mol/L was slowly added dropwise to the solution until the solution was neutral. Titanium tetrachloride was gradually and fully hydrolyzed to produce hydrated titanic acid, and then the hydrated titanic acid was ultrasonically dispersed, washed several times with deionized water and centrifuged to obtain the hydrated titanic acid. Next, the above hydrated titanic acid was dispersed in 100 ml of water, and then 5 ml of 30% hydrogen peroxide was added thereto under stirring to form a suspension containing titanium peroxo-complex. Next, 5 g of lithium hydroxide was added to the above suspension of peroxo-complex under stirring to form a pale yellow transparent solution. Next, 50 ml of ethanol was slowly added to the transparent solution under stirring at room temperature to obtain a nanowire lithium titanate precursor precipitate, which was separated by filtration to obtain lithium titanate precursor precipitate. The SEM image thereof is shown in FIG. 5. Subsequently, the precursor precipitate was dried, and then annealed at 350 degrees Celsius for 3 hours to obtain a nanostructured lithium titanate product. The SEM image thereof is shown in FIG. 6.

Figure 7:
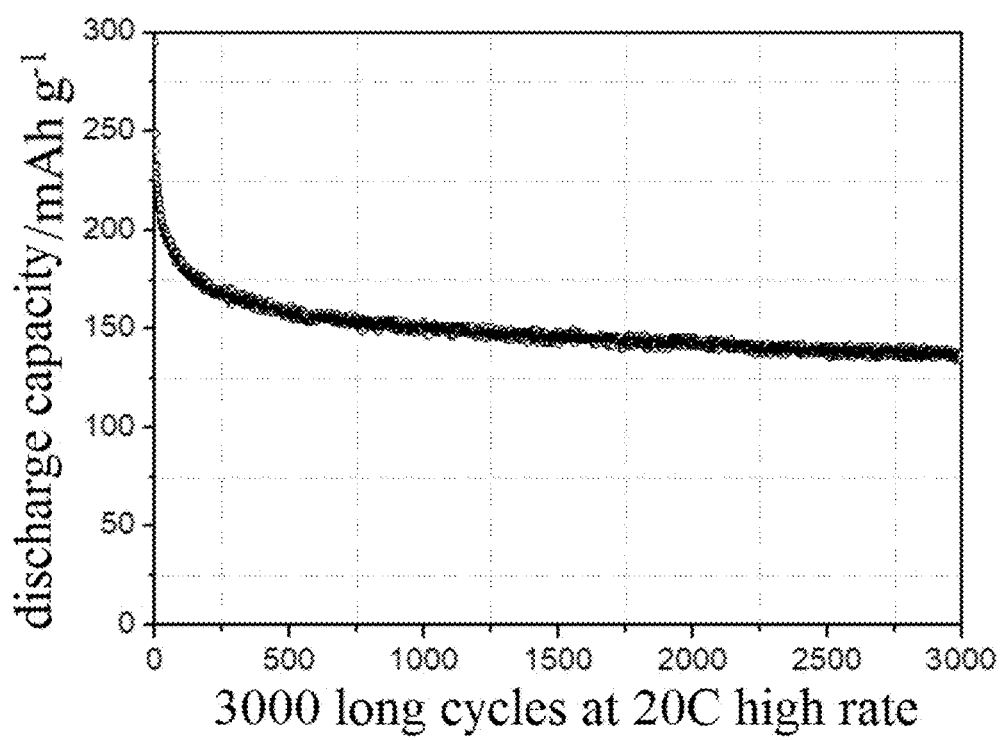
FIG. 7 is a curve showing the results of the cycle performance test of the lithium ion battery using the lithium titanate nanoparticles obtained in Example 7 as the electrode material.

FIG. 7 is a curve showing the results of the cycle performance test of the lithium ion battery using the lithium titanate nanoparticle obtained in this Example as the electrode material. The lithium ion battery electrode was prepared using knife coating process. Firstly, a slurry was prepared by mixing the raw materials in a mass ratio of lithium titanate (hierarchical microspheres): Super P:polyvinylidene fluoride (PVDF)=7:2:1 with N-methylpyrrolidone (NMP) as a solvent. Subsequently the slurry was uniformly coated on a copper foil using a knife coater, and then a model CR2032 button cell was assembled in a glove box with metallic lithium as a counter electrode, 1 mol/L $LiPF_6$/EC-DMC-EMC (1:1:1) as the electrolytic solution, and Glass Fiber as a separator, which was electrochemically tested. As can be seen from FIG. 7, due to small particle size of the material, the performance test result of the lithium ion battery using the material is excellent, and it still has a discharge capacity of 135 $mAhg^{-1}$ after 3000 cycles at 20 C high-rate charge and discharge rate, showing extremely high performance of lithium ion battery and excellent long-term cycle stability.

EXAMPLE 8

According to the process shown in FIG. 1, under stirring, 3 g of tetrabutyl titanate was dispersed in 100 ml of water, and then 10 ml of 30% urea peroxide was added thereto under stirring to form a suspension containing titanium peroxo-complex. Next, 3 g of lithium peroxide and 4 g of lithium acetate were added to the above suspension of peroxo-complex under stirring to form a pale yellow transparent solution. Next, 30 ml of propanol was slowly added to the transparent solution under stirring at room temperature to obtain a precursor precipitate, which was separated by centrifugation to obtain lithium titanate precursor precipitate. The SEM image thereof is substantially the same as FIG. 5. Subsequently, the precursor precipitate was dried, and then heated at 500 degrees Celsius for 4 hours to obtain a lithium titanate product. The SEM image thereof is substantially the same as FIG. 6.

EXAMPLE 9

According to the process shown in FIG. 1, under stirring, 3 g of titanium oxysulfate was dispersed in 100 ml of water to form a solution, and then potassium hydroxide at a concentration of 0.1 mol/L was slowly added dropwise to the solution until the solution was neutral. Titanium oxysulfate was gradually and fully hydrolyzed to produce hydrated titanic acid, and then the hydrated titanic acid was ultrasonically dispersed, washed several times with deionized water and centrifuged to obtain the hydrated titanic acid. Next, the above hydrated titanic acid was dispersed in 100 ml of water, and then 5 ml of 30% hydrogen peroxide was added thereto under stirring to form a suspension containing titanium peroxo-complex. Next, 12 g of potassium hydroxide was added to the above suspension of peroxo-complex under stirring to form a pale yellow transparent solution. Next, 100 ml of isopropanol was slowly added to the transparent solution under stirring at room temperature to obtain a nanostructured potassium titanate precursor precipitate, which was separated by filtration to obtain potassium titanate precursor precipitate. Subsequently, the precursor precipitate was dried, and then annealed at 350 degrees Celsius for 6 hours to obtain a nanostructured potassium titanate product.

EXAMPLE 10

According to the process shown in FIG. 1, under stirring, 3 g of titanium tetrachloride was dispersed in 100 ml of water to form a solution, and then aqueous ammonia at a concentration of 0.1 mol/L was slowly added dropwise to the solution until the solution was neutral. Titanium tetrachloride was gradually and fully hydrolyzed to produce hydrated titanic acid, and then the hydrated titanic acid was ultrasonically dispersed, washed several times with deionized water and centrifuged to obtain the hydrated titanic acid. Next, the above hydrated titanic acid was dispersed in 100 ml of water, and then 10 ml of 30% hydrogen peroxide was added thereto under stirring to form a suspension containing titanium peroxo-complex. Next, 1 g of barium hydroxide and 3 g of barium chloride were added to the above suspension of peroxo-complex under stirring to form a pale yellow transparent solution. Next, 100 ml of isopropanol was slowly added to the transparent solution under stirring at room temperature to obtain a precursor precipitate, which was separated by filtration to obtain barium titanate precursor precipitate. Subsequently, the precursor precipitate was dried, and then annealed at 550 degrees Celsius for 3 hours to obtain the barium titanate product.

What is claimed is:

1. A process for preparing a titanic acid salt, comprising:
   a) preparing a dispersion containing titanium peroxo-complex;
   b) adding a metal compound to the dispersion containing titanium peroxo-complex to form a solution;
   c) adding an alcohol to the solution under normal temperature and normal pressure to produce the titanic acid salt precursor precipitate in the solution, and separating the precipitate to obtain the titanic acid salt precursor; the normal temperature is 15 degrees Celsius to 35 degrees Celsius; the normal pressure is a standard atmospheric pressure at room temperature; and
   d) drying the precursor and then heat treating it to obtain a product of the titanic acid salt.

2. The process according to claim 1, wherein the titanic acid salt is one or more selected from lithium titanate, sodium titanate, potassium titanate, calcium titanate, barium titanate, strontium titanate or copper calcium titanate.

3. The production process according to claim 1, wherein, in a), the dispersion containing titanium peroxo-complex contains the titanium peroxo-complex at a concentration of 0.01 mol/L to 1 mol/L.

4. The process according to claim 1, wherein, in a), the process for preparing the dispersion containing titanium peroxo-complex includes dispersing a titanium source in an aqueous peroxide solution to form a dispersion; the titanium source is one or more selected from titanic acid, titanium metal, titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride, ammonium fluorotitanate, titanium nitride, or titanium oxide; the peroxide is one or more selected from hydrogen peroxide, urea peroxide or peracetic acid.

5. The process according to claim 4, wherein the molar ratio of the titanium source to the peroxide in the aqueous peroxide solution is 1:3 to 1:6.

6. The process according to claim 4, wherein the titanic acid is selected from hydrated titanic acid, metatitanic acid or orthotitanic acid; the hydrated titanic acid is obtained from a titanium-containing compound via a hydrolysis reaction.

7. The process according to claim 6, wherein the titanium-containing compound is one or more selected from titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride or ammonium fluorotitanate.

8. The process according to claim 6, wherein the hydrolysis reaction is to disperse the titanium-containing compound in pure water for direct hydrolysis to form the hydrated titanic acid; or
   the hydrolysis reaction is to disperse the titanium-containing compound in an aqueous solution containing an alkaline substance for hydrolysis to form the hydrated titanic acid.

9. The process according to claim 1, wherein, in a), a polymer is added to the dispersion while preparing the dispersion containing titanium peroxo-complex; the polymer is one or more selected from chitosan, guar gum, methyl cellulose, ethyl cellulose, hydroxyethyl cellulose, hydroxypropyl cellulose, hydroxypropyl methyl cellulose, polyvinyl alcohol, polyacrylamide, polyethylene oxide or polyvinyl pyrrolidone; the content of the polymer added in the solution is 0.01% to 10%.

10. The process according to claim 1, wherein, in b), the metal compound is a water-soluble metal compound.

11. The process according to claim 10, wherein the metal compound is selected from a first metal compound, or a composition of a first metal compound and a second metal compound.

12. The process according to claim 11, wherein the first metal compound is one or more selected from a metal hydroxide, a metal oxide, a metal peroxide or a metal superoxide; the second metal compound is one or more selected from a metal chloride, a metal fluoride, a metal bromide, a metal nitrate, a metal sulfate, a metal phosphate or a metal acetate.

13. The process according to claim 1, wherein, in b), the concentration of the metal ion in the solution formed by adding the metal compound is 0.5 mol/L to 4.0 mol/L.

14. The process according to claim 1, wherein, in c), the alcohol is one or more selected from methanol, ethanol, propanol, butanol, pentanol, ethylene glycol, propylene glycol, glycerol or polyethylene glycol.

15. The process according to claim 1, wherein, in c), the alcohol is added in a volume ratio of 5% to 50% of the solution.

16. The process according to claim 1, wherein, in d), the heat treatment step is carried out at a temperature of 150° C. to 1000° C. for 1 hour to 24 hours.

17. The process according to claim 1, further comprising surface modifying the titanic acid salt product produced in d); the surface modification comprises supporting one or more materials selected from carbon, carbon nanotubes, graphene, black phosphorus or metals.

* * * * *